(12) United States Patent
Eldering et al.

(10) Patent No.: US 8,273,425 B2
(45) Date of Patent: Sep. 25, 2012

(54) NANOTUBE ASSISTED SELF-CLEANING MATERIAL

(75) Inventors: Charles A. Eldering, Furlong, PA (US); Edward A. Ehrlacher, Philadelphia, PA (US)

(73) Assignee: Empire Technology Development LLC, Wilmington, DE (US)

( * ) Notice: Subject to any disclaimer, the term of this patent is extended or adjusted under 35 U.S.C. 154(b) by 461 days.

(21) Appl. No.: 12/465,717

(22) Filed: May 14, 2009

(65) Prior Publication Data

US 2010/0291375 A1    Nov. 18, 2010

(51) Int. Cl.
*A47G 19/22*    (2006.01)
*B32B 9/00*    (2006.01)

(52) U.S. Cl. ............... 428/34.4; 428/408; 428/702

(58) Field of Classification Search ........... 428/34.4, 428/702, 408; 502/350; 423/447.1, 447.2, 423/448, 460; 977/742, 782, 811, 813, 823, 977/832
See application file for complete search history.

(56) References Cited

U.S. PATENT DOCUMENTS

| | | | |
|---|---|---|---|
| 6,324,329 B1 | 11/2001 | Mizuno | |
| 6,913,811 B2 | 7/2005 | Itoh et al. | |
| 7,426,322 B2 | 9/2008 | Hyde | |
| 7,521,394 B2 | 4/2009 | Xie et al. | |
| 2003/0024180 A1 | 2/2003 | Hartig et al. | |
| 2007/0184975 A1 | 8/2007 | Yi et al. | |

FOREIGN PATENT DOCUMENTS

| | | |
|---|---|---|
| EP | 1726567 | 11/2006 |
| JP | 2000-035486 | 2/2000 |
| JP | 2001-018323 | 1/2001 |
| JP | 2005138050 A * | 6/2005 |

OTHER PUBLICATIONS

Machine Translation of JP 2005138050 A; 2005.*
R. Benedix, F. Dehn, J. Quaas & M. Orgass, "Application of Titanium Dioxide Photocatalysis to Create Self-Cleaning Building Materials," LACER No. 5, (2000), pp. 157-168.
P. Forbes, "Self-Cleaning Materials: Lotus Leaf-Inspired Nanotechnology," Scientific American, Aug. 2008. Last accessed at <http://www.scientificamerican.com/article.cfm?id=self-cleaning-materials> on Nov. 19, 2008.
"TOTO's Work with Environmentally Friendly Photocatalyst Technology," TOTO Today Newsletter, No. 36, Dec. 2003.
A. Shin'ichi, "The Light Clean Revolution," Look Japan Sci-Tech Feature, Jul. 2002. Last accessed at <http://www.lookjapan.com/LBst/02JulyST.htm> on Feb. 23, 2004.

(Continued)

*Primary Examiner* — Rena Dye
*Assistant Examiner* — James Yager
(74) *Attorney, Agent, or Firm* — Carlineo, Spicer & Kee, LLC

(57) ABSTRACT

A self-cleaning material is generally described that may include a substrate having a first surface. A self-cleaning layer of aligned nanotube structures may be formed on the first surface of the substrate, where absorption of light by the nanotube structures may cause a change in state of the self-cleaning material based on an angle of incidence of the light and an orientation vector corresponding to the layer of aligned nanotube structures.

17 Claims, 7 Drawing Sheets

OTHER PUBLICATIONS

O. Zhou, H. Shimoda, B. Gao, S. Oh, L. Fleming, & G. Yue, "Materials Science of Carbon Nanotubes: Fabrication, Integration, and Properties of Macroscopic Structures of Carbon Nanotubes," Accounts of Chemical Research, 2002, vol. 35, No. 12, pp. 1045-1053.

G. Dukovic, F. Wang, D. Song, M.Y. Sfeir, T.F. Heinz, & L.E. Brus, "Structural Dependence of Excitonic Optical Transitions and Band-Gap Energies in Carbon Nanotubes," Nano Letters, 2005, vol. 5, No. 11, pp. 2314-2318.

S. Kaneco, Y. Chen, P. Westerhoff, & J.C. Crittenden, "Fabrication of uniform size titanium oxide nanotubes: Impact of current density and solution conditions," Scripta Materialia 2007, vol. 56, pp. 373-376.

Su, et al., "Formation, microstructures and crystallization of anodic titanium oxide tubular array," Journal of Materials Chemistry, 2009 (19), pp. 2301-2309, Published on-line Mar. 16, 2009.

Kontos, et al., "Photo-induced effects on self-organized $TiO_2$ nanotube arrays; the influence of surface morphology," Nanotechnology, vol. 20 (2009) 045603, pp. 1-9 (first published Dec. 19, 2008).

"Successful Synthesis of Tungsten Oxide Nanotubes by a Simple Method—Expected to be used as a visible-light-driven photocatalyst for indoor application," AIST National Institute of Advanced Industrial Science and Technology, English translation of press release of Aug. 4, 2008 (online) (Retrieved on Jul. 14, 2010). Retrieved from the Internet <URL: http://www.aist.go.jp/aist_e/latest_research/2008/20080911/20080911.html>.

International Search Report by Graeme Broxam for PCT/US2010/034688, mailed Aug. 3, 2010. 11 pages.

International Search Report by Graeme Broxam for PCT/US2010/034677, mailed Aug. 3, 2010. 8 pages.

* cited by examiner

NANOTUBE ASSISTED SELF-CLEANING MATERIAL

CROSS REFERENCE TO RELATED APPLICATION

This application is related to U.S. patent application Ser. No. 12/465,711, filed May 14, 2009, now U.S. Pat. No. 8,075,980 and entitled Diffraction Grating Assisted Self-cleaning Material.

BACKGROUND

The present disclosure relates to self-cleaning materials, and more specifically to materials utilizing self-cleaning layers of aligned nanotubes.

Self-cleaning materials are effective at keeping products and surfaces clean for long periods of time. Self-cleaning materials are being increasingly utilized for a number of applications including building exteriors, bathrooms, windows, and coatings for various surfaces.

BRIEF DESCRIPTION OF THE DRAWINGS

The following detailed description will be better understood when read in conjunction with the following description and appended claims, taken in conjunction with the accompanying drawings, in which there is shown one or more of the multiple embodiments of the present disclosure. It should be understood, however, that the various embodiments of the present disclosure are not limited to the precise arrangements and instrumentalities shown in the drawings.

In the Drawings.

DETAILED DESCRIPTION

Figure 1:
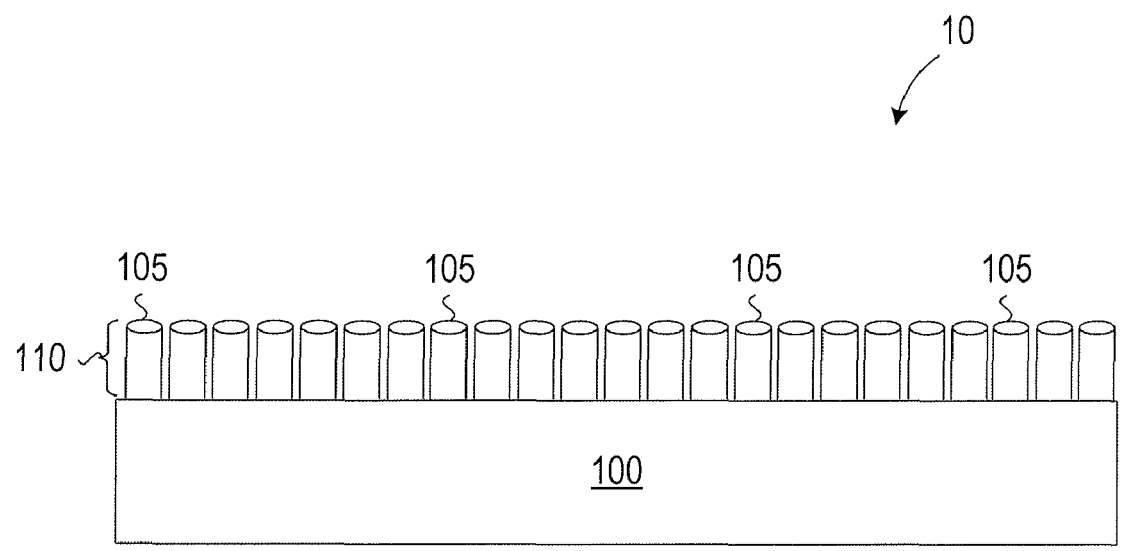
FIG. 1 is a cross-sectional view illustrating an example self-cleaning material.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Briefly stated, the multiple embodiments of the present disclosure include a self-cleaning material including a substrate having a first surface. A self-cleaning layer of aligned nanotube structures may be formed on the first surface of the substrate, where absorption of light by the nanotube structures may cause a change in state of the self-cleaning material based on an orientation vector corresponding to the layer of aligned nanotube structures.

A self-cleaning material is disclosed that includes a layer of nanotubes on a substrate. FIG. 1 is a cross-sectional view illustrating an example self-cleaning material 10, arranged in accordance with at least some embodiments of the present disclosure. The self-cleaning material 10 includes a substrate 100 and a self-cleaning layer 110 of nanotubes 105. The nanotubes 105 may be deposited or grown on to a surface of the substrate 100 as discussed in greater detail below. The nanotubes 105 may be formed using a material exhibiting some type of self-cleaning properties when exposed to an appropriate wavelength of light, i.e., the nanotubes 105 may generally exhibit, for example, photocatalytic, photo-induced hydrophilic, or photo-induced hydrophobic properties due to the absorption of photons corresponding to the appropriate wavelength of the light incident on the self-cleaning layer 110. For example, self-cleaning properties of some self-cleaning materials, such as titanium dioxide ($TiO_2$), are enhanced or activated in response to light in the ultraviolet region of the spectrum, while other self-cleaning materials, such as nickel doped indium tantalate ($In_{(1-x)}Ni_xTaO_4$), may be responsive to light in the visible region of the spectrum. The activation or enhancement of the photocatalytic, photo-induced hydrophilic, or photo-induced hydrophobic self-cleaning properties of the self-cleaning layer 110 may also be referred to as a change of state of the self-cleaning layer 110. The change of state may also include a switching from one of the self-cleaning properties to a different self-cleaning property. The exposure to, and resulting absorption of, the light may also cause the nanotubes 105 to exhibit more than one of these properties. For example, the nanotubes 105 may become both photocatalytic and hydrophilic, as will be understood in light of the present disclosure. In some embodiments, the nanotubes 105 may be oriented with respect to the surface of the substrate 100 to enhance light absorption by the nanotubes 105 and thus may enhance or activate the self-cleaning properties. In some embodiments, the nanotubes 105 may be substantially parallel with respect to each other. The orientation of the nanotubes 105 with respect to the surface of the substrate 100 may be described using an orientation vector (not shown in FIG. 1), described in more detail below.

In the present disclosure, the self-cleaning material 10 may include the structure of the substrate 100 and the self-cleaning layer 10 of the nanotubes 105 in combination. While the substrate 100 alone may not necessarily exhibit cleaning properties, for convenience, the particular substrates 100 referred to herein as self-cleaning are understood to be in combination with a self-cleaning layer 110, such that the combined structure exhibits self-cleaning properties. For example, a glass substrate with a layer of $TiO_2$ nanotubes may be referred to herein simply as self-cleaning glass. In some embodiments, the substrate 100 in the absence of the self-cleaning layer 110 of nanotubes 105 may, under some conditions, exhibit self-cleaning properties (i.e., the substrate may itself be a self-cleaning material), with the self-cleaning layer 110 of nanotubes 105 being used to enhance or change the self-cleaning properties of the substrate 100.

The substrate 100 may be any base material for which self-cleaning properties are desired. Some examples of substrates include glass, ceramics, metals, composites, or other building materials. The nanotubes 105 may be any material exhibiting self-cleaning properties generally known in the art, such as titanium dioxide (also know as $TiO_2$ and titania) or nickel doped indium tantalate ($In_{(1-x)}Ni_xTaO_4$). Methods of nanotube formation, such as chemical vapor deposition (CVD) and pre-cursor templating may be utilized, although a detailed discussion thereof is omitted here for convenience only and should not be considered limiting. Furthermore, techniques for depositing aligned layers of nanotubes on a surface, such as Langmuir-Blodgett deposition, self-assembly processes, and sputtering in an electromagnetic field, is also omitted here for convenience only and should not be considered limiting. In some embodiments, the nanotubes 105 may generally be single walled, aligned structures, although the self-cleaning materials 10 described herein are not limited to such arrangements. The self-cleaning layer 110 of nanotubes 105 may be transparent with respect to the substrate 100, and may conform to contours of the substrate 100 such that the self-cleaning layer 110 of nanotubes 105 may largely be indistinguishable with respect to the substrate 100. In addition, the substrate 100 may include a self-cleaning layer of nanotubes on one or more surfaces of the substrate.

In the embodiments of the present disclosure, the self-cleaning materials 10 may be used in a controlled or uncontrolled environment. A controlled environment may generally refer to a space where environmental parameters can be controlled and stabilized (e.g., indoors or an otherwise enclosed area), and may generally be free from exposure to weather or other volatile conditions. Environmental parameters may include but are not limited to temperature, humidity, and illumination. In contrast, an uncontrolled environment may generally refer to a space where the environmental parameters are not readily controlled (e.g., outdoors), and surfaces may be exposed to weather conditions. In some embodiments, one surface of the self-cleaning material 10 may be exposed to a controlled environment, and another surface of the self-cleaning material 10 may be exposed to an uncontrolled environment. One example is a self-cleaning window (not shown), where one surface of the window may be an exterior surface and the other surface of the window may be an interior surface.

Incident light, or simply light, may refer to the electromagnetic radiation in the visible, ultraviolet, and infrared regions of the electromagnetic spectrum impinging on a surface of the self-cleaning material 10. The exposure of a surface to light may also referred to herein as illuminating or illumination of the surface in question. Illumination characteristics for a surface may include one or more of angle of incidence of the incident light, intensity of the incident light, wavelength distribution of the incident light, and/or the intensity distribution as a function of the wavelength.

The angle of incidence of the incident light may be measured from an axis perpendicular to (i.e., normal to) the surface of the self-cleaning material. An angle of incidence of zero (i.e., normal incidence) may refer to the illumination condition where the incident light impinges on the surface of the self-cleaning material 10 substantially perpendicular to the surface. Glancing incidence may refer to illumination of the self-cleaning material where the angle of incidence approaches 90 degrees (i.e., nearly parallel to the surface of the self-cleaning material). Since light impinging on the self-cleaning material may not be exactly collimated or collinear, the angle of incidence may refer to the angle with the highest total intensity of light illuminating the surface. For example, illumination of a surface by direct sunlight may tend to have a higher total intensity than sunlight scattered onto the surface from other objects; thus, the angle of incidence may be measured using the incident light from the sun.

In view of the present disclosure, it will be appreciate that illumination (also referred to as exposure) of the surface of the self-cleaning material 10 may be dependent on the environment. In an uncontrolled environment, such as outdoors, the illumination characteristics may be variable—dependent on time of day, season, proximate natural and man-made objects, and latitude—as the electromagnetic radiation from the sun reaching the surface of the earth may be dependent on one or more of these variables. Conversely, in a controlled environment, such as an interior space with fixed lighting, the illumination characteristics may generally be dependent on the type and positioning of the lighting fixtures, with little variability other than switching on/off the lighting, using a light dimmer, or changing the type or wattage of the light bulbs, etc.

Figure 2:
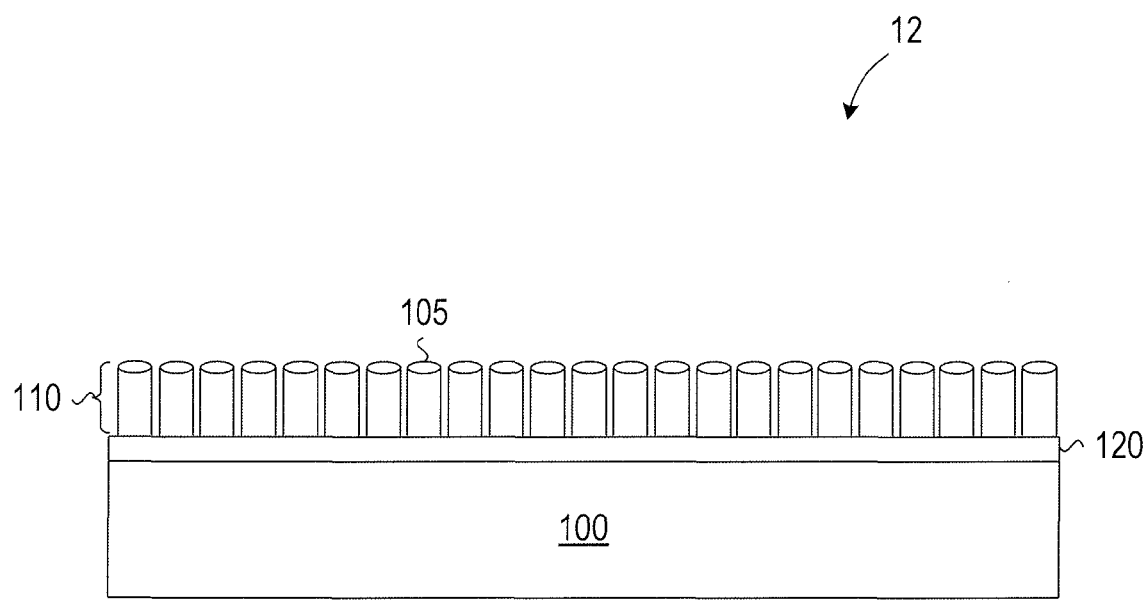
FIG. 2 is a cross-sectional view illustrating an example self-cleaning material with a seed layer.

FIG. 2 is a cross-sectional view illustrating an example self-cleaning material 12 that includes a seed layer 120, arranged in accordance with at least some embodiments of the present disclosure. In some embodiments, a seed layer 120 is deposited on the substrate 100 before the nanotubes 105 are grown. The seed layer 120 is a thin film that acts a template for growth of the nanotubes 105 that form the self-cleaning layer 110. Growth of layers 110 of aligned nanotube structures 105 on a substrate 100 are well know in the art, and detailed discussion thereof is omitted here for convenience only and should not be considered limiting.

Figure 3:
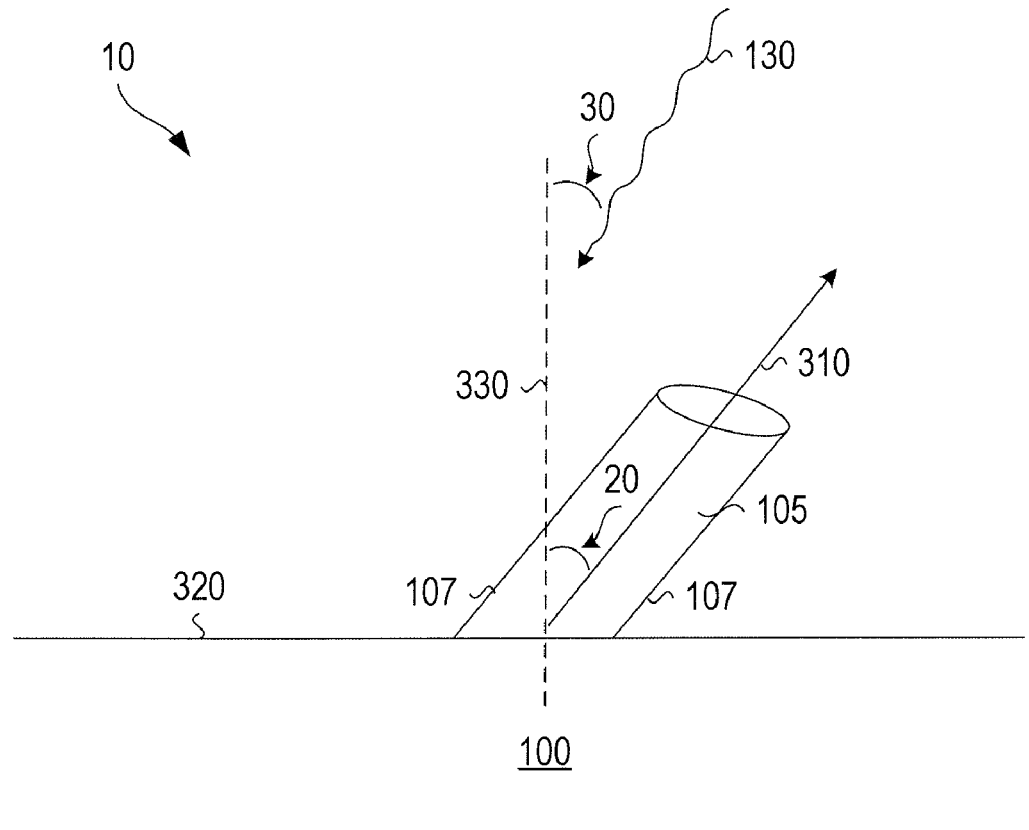
FIG. 3 is an enlarged cross-sectional view illustrating an example self-cleaning material showing an example of light incident thereon.

FIG. 3 is an enlarged cross-sectional view of an example self-cleaning material 10 showing an example of light incident thereon, arranged in accordance with at least some embodiments of the present disclosure. Similar to the example of FIG. 1, the self-cleaning material 10 may include a substrate 100 and a layer of nanotubes 105. The nanotubes 105 may be disposed on a surface 320 of the substrate 100 at an orientation angle 20 with respect to the surface 320 (for convenience only, a single nanotube 105 is shown in FIG. 3). An orientation vector 310 may be defined along an axis (not shown) substantially parallel to the sidewalls 107 of the aligned nanotubes 105. The orientation angle 20 may be the angle formed by the axis 330 that is normal to the surface 320 of the substrate 100 and the orientation vector 310. Light 130 incident on the nanotubes 105 having an angle of incidence 30 (measured with respect to the axis 330) may be absorbed by the nanotubes 105 to activate the self-cleaning properties of the self-cleaning layer 110 (see FIG. 1). In some embodiments, the self-cleaning properties of the self-cleaning layer 110 may be enhanced as the angle of incidence 30 approaches the orientation angle 20 (i.e., as the incident light 130 becomes more nearly parallel to the orientation vector 310). In some embodiments, if the angle of incidence 20 is not matched to the orientation angle 30, the absorption of the incident light 130 by the nanotubes 105 may be insufficient to activate the photo-induced self-cleaning properties of the self-cleaning material 10.

Figure 4:
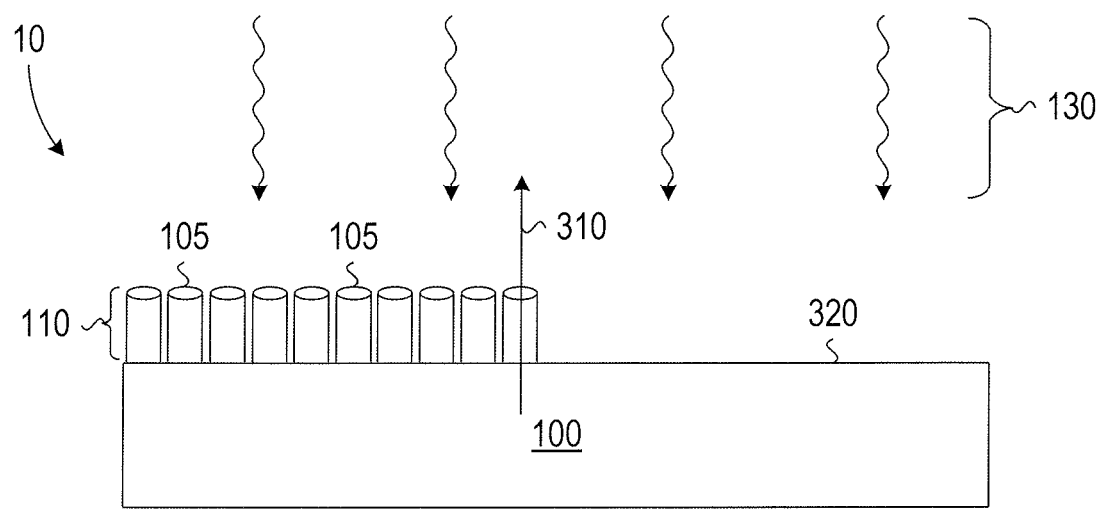
FIG. 4 is a cross-sectional view illustrating an example self-cleaning material with an orientation vector for nearly normal incident exposure.

FIG. 4 is a cross-sectional view illustrating an example self-cleaning material 10 having an orientation vector 310 selected for nearly normal incident exposure of the light 130, arranged in accordance with at least some embodiments of the present disclosure. The orientation vector 310, as described above with respect to FIG. 3, may correspond to the orientation of the nanotubes 105 with respect to the surface 320 of the substrate 10. For an illumination condition where the incident light 130 may be perpendicular (i.e., normal incidence) or nearly perpendicular to the surface 320 (i.e., low angle of incidence), the self-cleaning properties of the self-cleaning layer 110 may be enhanced when the orientation vector 310 is perpendicular or nearly perpendicular to the surface 320 (i.e., small orientation angle) and the orientation vector 310 is nearly parallel to incident light 130. For example, a self-cleaning ceramic tile may be used in a horizontal orientation, such as on a floor or other horizontal surface. For light sources such as the sun outdoors or ceiling lighting fixtures indoors, the angle of incidence of the light illuminating the surface of the tile may nearly be normal to the surface. Thus, a self-cleaning material 10 having an orientation vector 310 for the nanotubes 105 with a small orientation angle 20 (see FIG. 3) may provide efficient self-cleaning properties.

Figure 5:
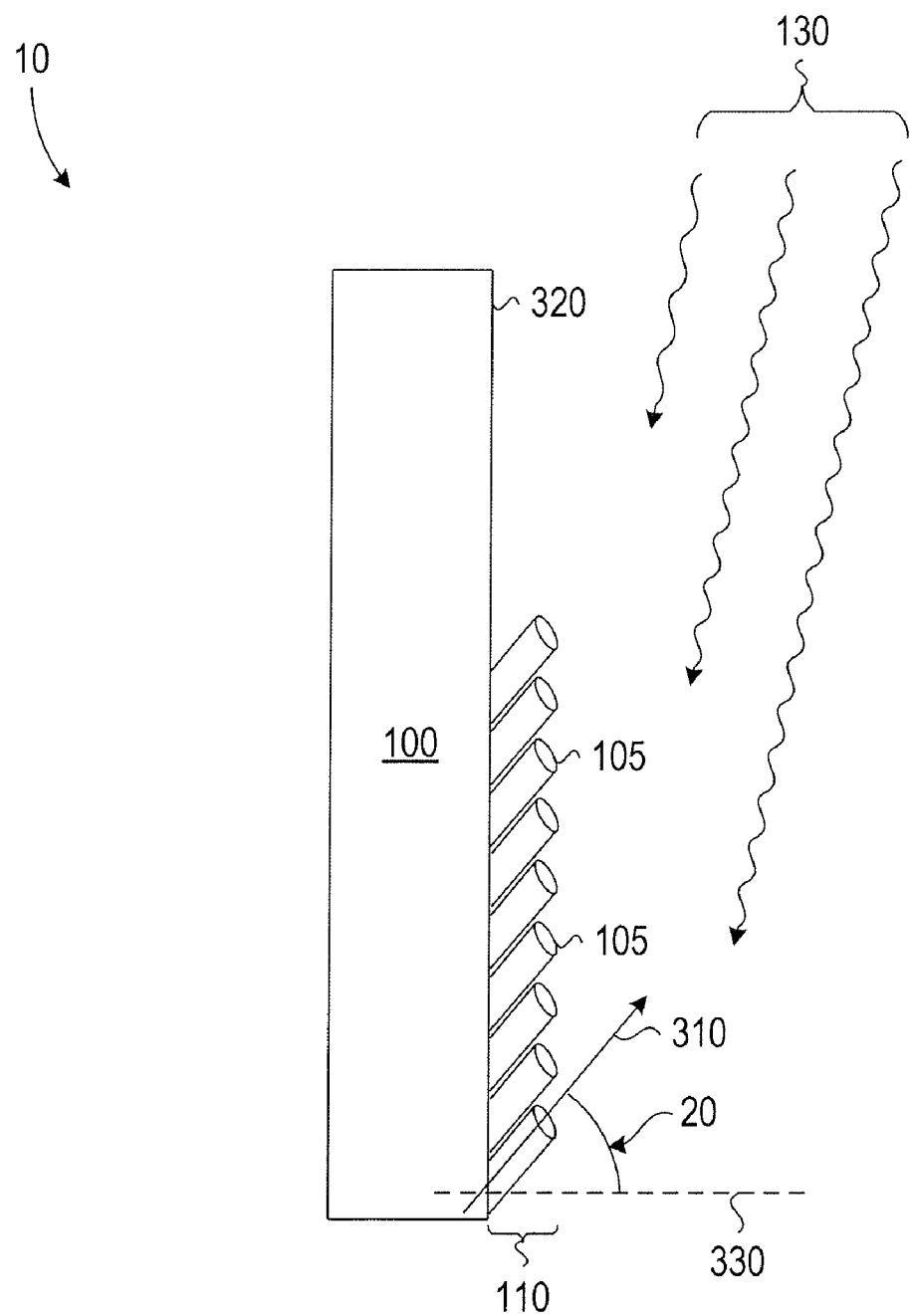
FIG. 5 is a cross-sectional view illustrating an example self-cleaning material with an orientation vector for glancing incident exposure.

FIG. 5 is a cross-sectional view illustrating an example self-cleaning material 10 having an orientation vector 310 selected for glancing incident exposure of the light 130, arranged in accordance with at least some embodiments of the present disclosure. The orientation vector 310, as described above with respect to FIG. 3, corresponds to the orientation of the nanotubes 105 with respect to the surface 320 of the substrate 10. For an illumination condition where the incident light 130 may be substantially parallel to the surface 320 (i.e., glancing incidence or high angle of incidence), the self-cleaning properties of the self-cleaning layer 110 may be enhanced when the orientation vector 310 is nearly parallel to the surface 320 (i.e., large orientation angle 20), and the orientation vector 310 is nearly parallel to incident light 130. For example, for a self-cleaning ceramic tile used in a vertical orientation such as mounted on a wall under the same illumination conditions as previously described with respect to the example of FIG. 4, the angle of incidence 30 (see FIG. 3) of the light illuminating the surface may be high, even approaching glancing incidence. A self-cleaning material 10 with an orientation vector 310 for the nanotubes 105 having a large orientation angle 20 may thus provide the efficient self-cleaning properties for the self-cleaning ceramic tile in the vertical orientation.

Figure 6:
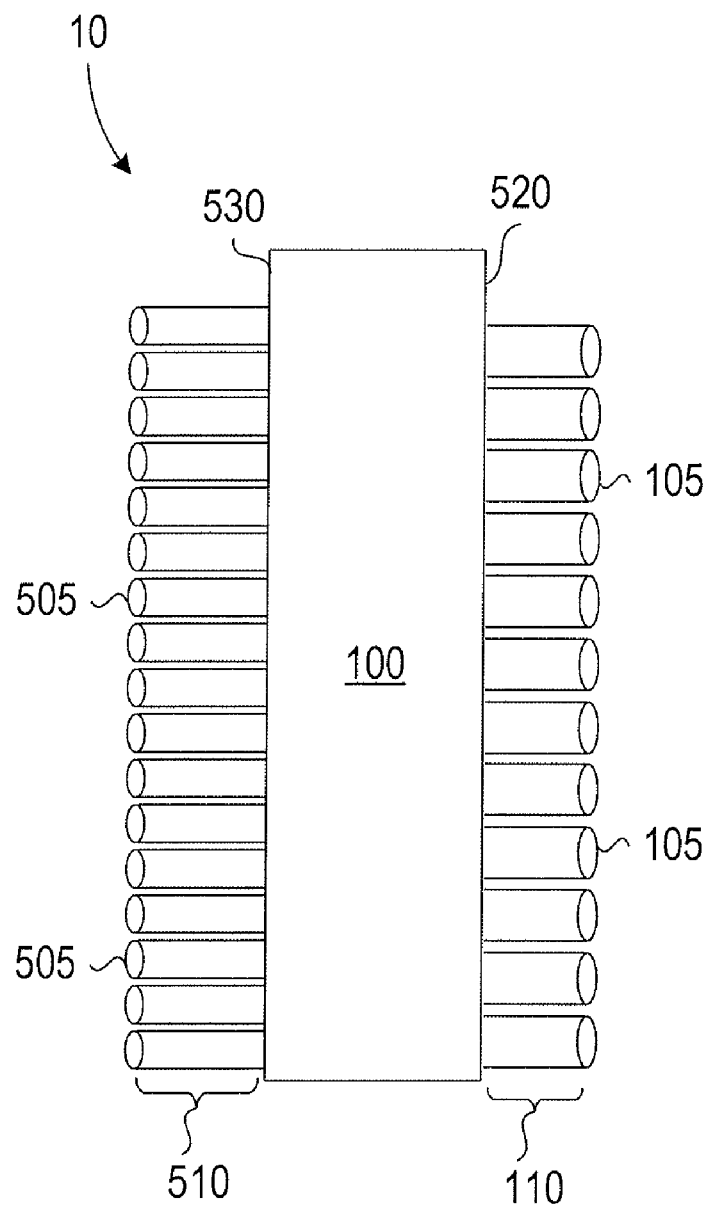
FIG. 6 is a cross-sectional view illustrating an example self-cleaning material where multiple surfaces of the substrate include a self-cleaning layer.

FIG. 6 is a cross-sectional view illustrating an example self-cleaning material 10 where multiple surfaces 520, 530 of the substrate 100 include self-cleaning layers 110, 510, respectively, in accordance with at least some embodiments of the present disclosure. Self-cleaning layer 110 may include nanotubes 105 formed on a first surface 520 of the substrate 100. Self-cleaning layer 510 may include nanotubes 505 formed on a second surface 530 of the substrate 100. The depiction of the surfaces 520, 530 as parallel or on opposite sides of the substrate 100 in FIG. 6 should not be considered limiting. For example, for a cubic substrate (not shown), two adjacent surfaces of the cube may have a self-cleaning layer (e.g., a block of building material on the corner has two adjacent exterior sides). Likewise, some embodiments may include a self-cleaning material 10 where more than two surfaces of the substrate may have a self-cleaning layer.

Still referring to FIG. 6, the nanotubes 105, 505 of the self-cleaning layers 110, 510 may be the same material, or alternately the nanotubes 105 of the self-cleaning layer 110 may be a different material than the nanotubes 505 of the self-cleaning layer 510. In some embodiments, the nanotubes 105, 505 may be selected based on the type of environment or the self-cleaning properties desired for each surface 520, 530 of the self-cleaning material 10. For example, one surface of the self-cleaning material 10 may be exposed to a controlled environment, while another surface of the self-cleaning material may be exposed to an uncontrolled environment. In the controlled environment, photocatalytic properties used to disinfect the surfaces of the controlled environment may be important, while in the uncontrolled environment, hydrophilic properties may be more important to keep the surface from soiling.

Figure 7:
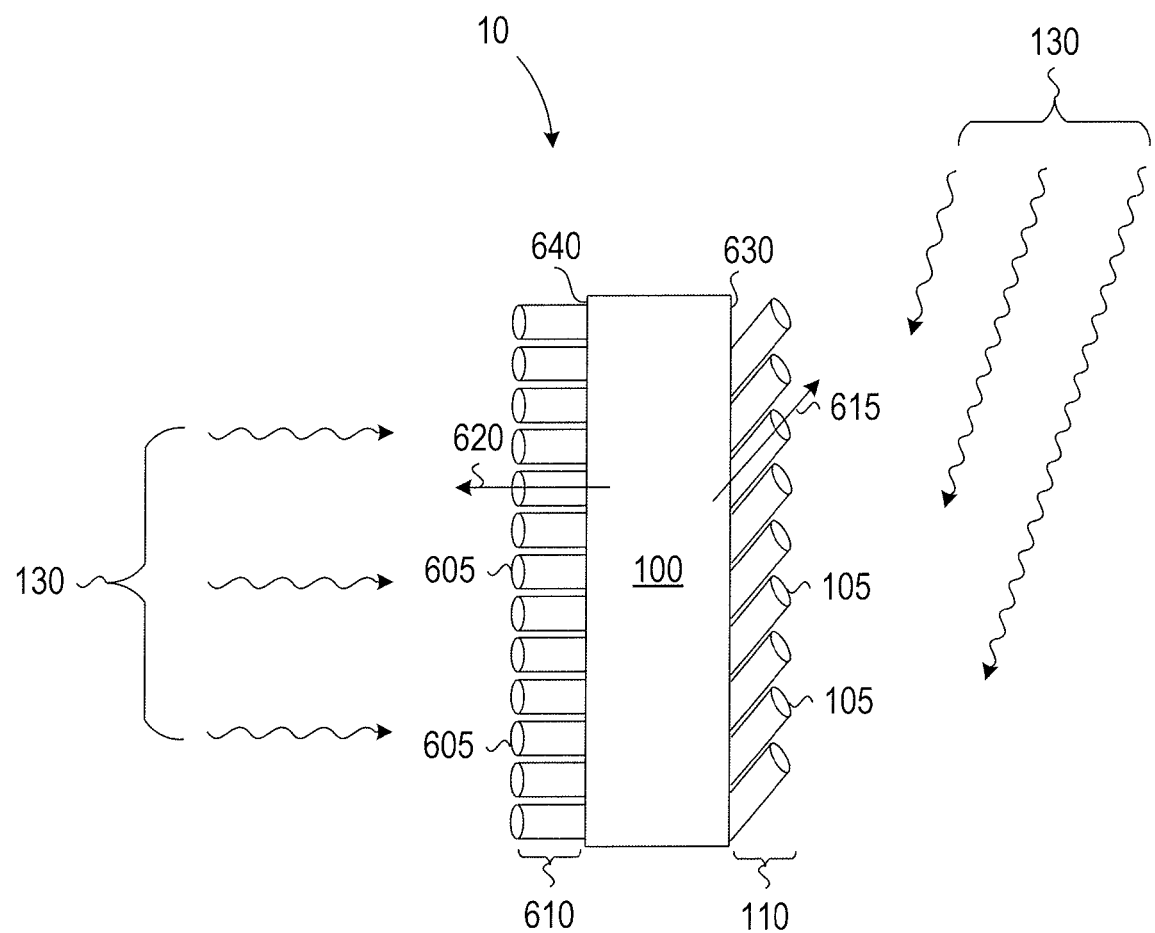
FIG. 7 is a cross-sectional view illustrating an example self-cleaning material where multiple surfaces of the substrate include a self-cleaning layer with different orientation vectors; all arranged in accordance with at least some embodiments of the present disclosure.

FIG. 7 is a cross-sectional view illustrating an example self-cleaning material 10 where multiple surfaces 630, 640 of the substrate 100 include a self-cleaning layer 110, 610 having different orientation vectors 615, 620, respectively, in accordance with at least some embodiments of the present disclosure. Self-cleaning layer 110 includes nanotubes 105 formed on a first surface 630 of the substrate 100 having a first orientation vector 615. Self-cleaning layer 610 includes nanotubes 605 formed on a second surface 640 of the substrate 100 having a second orientation vector 620. As discussed above with respect to FIG. 6, the depiction of the surfaces 630, 640 as parallel or on opposite sides of the substrate 100 in FIG. 7 should not be considered limiting. Likewise, some embodiments may include a self-cleaning material 10 where more than two surfaces of the substrate may have a self-cleaning layer.

Still referring to FIG. 7, the nanotubes 105, 605 of the self-cleaning layers 110, 610 may be the same material, or alternately the nanotubes 105 of self-cleaning layer 110 may be a different material than the nanotubes 605 of self-cleaning layer 610. The orientation vectors 615, 620 may be selected based on the expected or most probable illumination conditions of their respective surfaces 630, 640. Thus, in the embodiments of FIG. 7, for example, the orientation angle 20 (see FIG. 3) associated with the first orientation vector 615 may be noticeably larger than the orientation angle 20 associated with the second orientation vector 620. In FIG. 7, the second surface 640 of the self-cleaning material 10 may most typically be illuminated with light 130 of normal incidence; thus, an orientation vector 620 with a low orientation angle 20 is used. In contrast, for the first surface 630 of the self-cleaning material 10, the most typical illumination may be glancing incidence, and an orientation vector 615 with a high orientation angle may be used. For example, for a self-cleaning material used in a vertical orientation (e.g., self-cleaning glass used in a window), the direct illumination of the exterior surface of the window by sunlight may be considered as glancing illumination (a very high angle of incidence), while the illumination of the interior side of the window by interior light fixtures may have much lower angles of incidence.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A self-cleaning material that is responsive to exposure to light comprising:
    a substrate having a first surface; and
    a self-cleaning layer of longitudinally aligned nanotube structures formed on the first surface of the substrate, wherein longitudinal axes of the nanotube structures are parallel to each other and form a non-zero acute orientation angle with respect to an axis normal to the first surface such that the self-cleaning material changes states responsive to the exposure to light based at least in part on an angle of incidence of the light and the orientation angle.

2. The self-cleaning material of claim 1, wherein the self-cleaning layer is further arranged such that absorption of light by the self-cleaning layer of aligned nanotube structures increases as the angle of incidence of the light approaches the orientation angle.

3. The self-cleaning material of claim 1, wherein the self-cleaning layer of aligned nanotube structures is either photocatalytic, hydrophobic, and/or hydrophilic in response to exposure to the light.

4. The self-cleaning material of claim 3, wherein the light is ultraviolet light.

5. The self-cleaning material of claim 1, wherein the nanotube structures at least partially comprise titanium dioxide nanotube structures.

6. The self-cleaning material of claim 1, wherein the nanotube structures are a different material than the substrate.

7. A self-cleaning material that is responsive to exposure to light comprising:
    a substrate having a first surface and a second surface;
    a first self-cleaning layer of longitudinally aligned nanotube structures formed on the first surface of the substrate, wherein first longitudinal axes of the nanotube structures of the first self-cleaning layer are parallel to each other and form a first non-zero acute orientation angle with respect to an axis normal to the first surface and arranged such that the first self-cleaning layer changes states responsive to the exposure to light based at least in part on the first orientation angle; and
    a second self-cleaning layer of longitudinally aligned nanotube structures formed on the second surface of the substrate, wherein second longitudinal axes of the nanotube structures of the second self-cleaning layer are parallel to each other and form a second non-zero acute orientation angle with respect to an axis normal to the second surface and arranged such that the second self-cleaning layer changes states responsive to the exposure to light based at least in part on the second orientation angle.

8. The self-cleaning material of claim 7, wherein the nanotube structures of the first self-cleaning layer and the nanotube structures of the second self-cleaning layer are different materials.

9. The self-cleaning material of claim 7, wherein the first and second self-cleaning layers are further arranged such that absorption of light by the first and second self-cleaning layers causes the first and second self-cleaning layers, respectively, to become either photocatalytic, hydrophobic, and/or hydrophilic.

10. The self-cleaning material of claim 9, wherein the second self-cleaning layer exhibits a different self-cleaning property than the first self-cleaning layer.

11. The self-cleaning material of claim 7, wherein the first and second orientation angles correspond to most probable angles of incidence of the light on the first and second self-cleaning layers, respectively.

12. The self-cleaning material of claim 7, wherein the first orientation angle is selected based on the first self-cleaning layer being utilized in an uncontrolled environment and the second orientation angle is selected based on the second self-cleaning layer being utilized in a controlled environment.

13. A self-cleaning material that is responsive to exposure to light comprising:

a first self-cleaning layer of longitudinally aligned titanium dioxide nanotube structures formed on a first surface of a glass substrate, wherein first longitudinal axes of the titanium dioxide nanotube structures of the first self cleaning layer are parallel to each other and form a first non-zero acute orientation angle with respect to an axis normal to the first surface such that absorption of light by the titanium dioxide nanotube structures of the first self cleaning layer induces a photo-induced hydrophilic state of the first self-cleaning layer of aligned titanium dioxide nanotube structures based at least in part on a first angle of incidence of the light and the first orientation angle.

14. The self-cleaning material of claim 13, wherein the first self-cleaning layer is further arranged such that absorption of light by the first self-cleaning layer of aligned titanium dioxide nanotube structures is increased as the first angle of incidence of the light approaches the orientation angle.

15. The self-cleaning material of claim 13, wherein the self-cleaning layer is further arranged such that absorption of light by the titanium dioxide nanotube structures of the first self-cleaning layer further induces a photocatalytic state of the self-cleaning layer based on the orientation angle and the angle of incidence of the light with the first surface of the glass substrate.

16. The self-cleaning material of claim 15, wherein the light is ultraviolet light.

17. The self-cleaning material of claim 13, further comprising:
a second self-cleaning layer of longitudinally aligned titanium dioxide nanotube structures formed on a second surface of the glass substrate, wherein second longitudinal axes of the titanium dioxide nanotube structures of the second self cleaning layer are parallel to each other and form a second non-zero acute orientation angle with respect to an axis normal to the second surface such that absorption of light by the titanium dioxide nanotube structures of the second self cleaning layer induces a photo-induced hydrophilic state of the second self-cleaning layer based at least in part on a second angle of incidence of the light and the second orientation angle.

* * * * *

UNITED STATES PATENT AND TRADEMARK OFFICE
CERTIFICATE OF CORRECTION

PATENT NO. : 8,273,425 B2
APPLICATION NO. : 12/465717
DATED : September 25, 2012
INVENTOR(S) : Eldering et al.

It is certified that error appears in the above-identified patent and that said Letters Patent is hereby corrected as shown below:

On the Title page:

On Page 2, Item (56), under "OTHER PUBLICATIONS", in Column 2, Line 1, delete "TiO2" and insert -- $TiO_2$ --, therefor.

On Page 2, Item (56), under "OTHER PUBLICATIONS", in Column 2, Line 6, delete "AIST" and insert -- (AIST) --, therefor.

In the Specification:

In Column 1, Lines 9-10, delete "Diffraction Grating Assisted Self-cleaning Material." and insert -- "Diffraction Grating Assisted Self-cleaning Material". --, therefor.

In Column 2, Line 56, delete "10" and insert -- 110 --, therefor.

In Column 2, Line 62, delete "Ti0$_2$" and insert -- $TiO_2$ --, therefor.

In Column 3, Line 8, delete "know as Ti0$_2$" and insert -- known as $TiO_2$ --, therefor.

In Column 4, Line 31, delete "know" and insert -- known --, therefor.

In Column 4, Line 56, delete "angle of incidence 20" and insert -- angle of incidence 30 --, therefor.

In Column 4, Line 57, delete "orientation angle 30," and insert -- orientation angle 20, --, therefor.

In Column 5, Line 1, delete "substrate 10." and insert -- substrate 100. --, therefor.

In Column 5, Line 25, delete "substrate 10." and insert -- substrate 100. --, therefor.

Signed and Sealed this
Twenty-fifth Day of June, 2013

Teresa Stanek Rea
*Acting Director of the United States Patent and Trademark Office*

CERTIFICATE OF CORRECTION (continued)
U.S. Pat. No. 8,273,425 B2

In the Claims:

In Column 9, Lines 4-5, delete "self cleaning" and insert -- self-cleaning --, therefor at each occurrence throughout the claims.